Sept. 22, 1959 T. F. VAJDA 2,904,890
OPTICAL TARGET
Filed July 1, 1957

INVENTOR.
TOMMY F. VAJDA
BY
George C. Sullivan
Agent 2,904,890
Patented Sept. 22, 1959

2,904,890

OPTICAL TARGET

Tommy F. Vajda, Van Nuys, Calif., assignor to Lockheed Aircraft Corporation, Burbank, Calif.

Application July 1, 1957, Serial No. 669,232

4 Claims. (Cl. 33—74)

This invention relates to optical targets for aligning large structures such as aircraft or missile fuselages and the like. Conventionally a flat target is used with standard optical tooling equipment however where the alignment of a large structure is to be checked the use of the flat target is not practical because it cannot be viewed at an angle nor is it readily squareable to a center line when it must be tilted to square it to the line of sight for proper viewing. Therefore it has become common practice to employ a complex arrangement of mirrors in combination with the conventional flat target when the alignment of a large structure such as a missile fuselage is involved.

An object of this invention is to provide an optical target wihch is hemispherically shaped so that it may be viewed at an oblique angle through the sighting lens system of a transit whereby the necessity of employing a complex arrangement of mirrors is obviated.

It is another object of this invention to provide an optical target which is compatible with standard optical tooling equipment and techniques and which is self squaring to readily indicate structural misalignment.

Still another object of this invention is to provide an optical target which is easy to read and which may be manufactured economically from materials such as synthetic resin plastics.

Further and other objects will become apparent from a reading of the following description especially when considered in combination with the accompanying drawing wherein like numerals refer to like parts:

In the drawing:

Figure 6 shows the optical target as viewed through a transit when out of lateral alignment.

Figure 1:
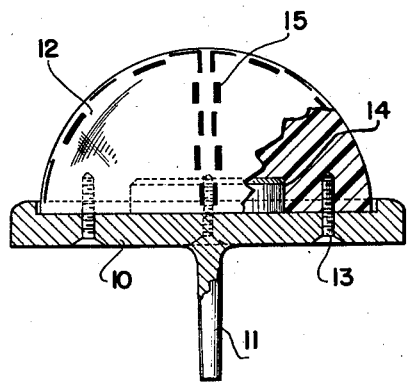
Figure 1 is a fragmentary sectional side view of the optical target.
Figure 2:
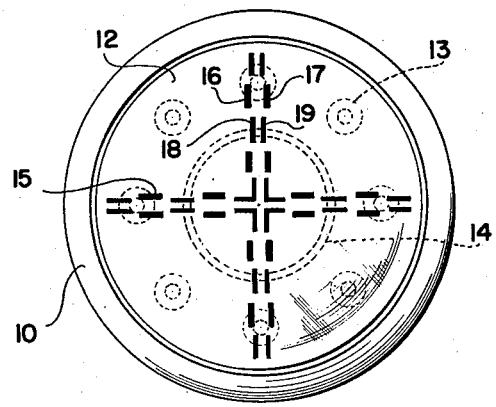
Figure 2 is a plan view of the target.

Referring to Figures 1 and 2 the optical target includes a base or mounting plate 10 having a post 11 projecting outwardly therefrom for attaching the target to structure the alignment of which is to be checked. A hemispherically shaped dome member 12 is secured to base 10 by suitable means such as screws 13. To facilitate alignment of dome member 12 with respect to base 10 a suitable centering pin 14 forming a part of the base member projects into a mating re-entrant cavity formed in the dome member as shown in Figure 1.

A pair of great circle paths normal to each other are indicated on dome member 12 through the use of a plurality of spaced segmented marks 15. Adjacent pairs of marks such as 16 and 17, and 18 and 19 are spaced apart differently so that alignment can be readily and accurately checked through a transit at all reasonable target ranges. Dome member 12 may be formed of any desired material and by any manufacturing process however since for accuracy the dome must be made to close tolerances it is preferred that a synthetic resin plastic material be used so that the part may be molded in a forming die.

Figure 3:
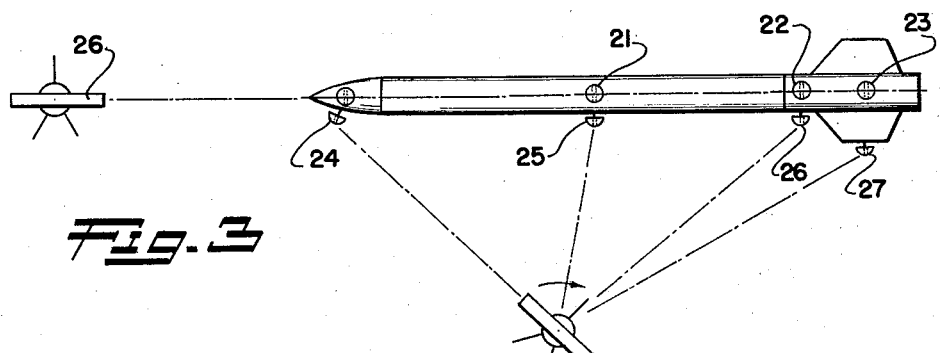
Figure 3 is a view showing the optical target in use for checking the center line of a missile.
Figure 4:
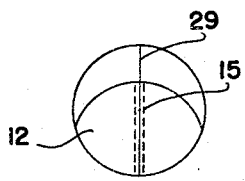
Figure 4 shows the optical target as viewed through a transit when in alignment.
Figure 5:
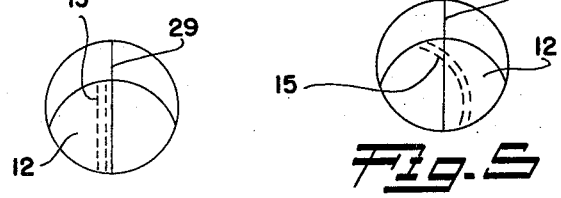
Figure 5 shows the optical target as viewed through a transit when out of angular alignment.

In checking the accuracy of the horizontal and vertical center lines of a missile, for example, as shown in Figure 3, optical targets like that shown in Figures 1 and 2 are mounted at predetermined location points on the outer surface of the missile body. Targets 20, 21, 22 and 23 represent those arranged to check the vertical center line linearity and targets 24, 25, 26 and 27 are arranged to check the horizontal center line linearity. A transit 28 is set up for use with targets 20, 21, 22 and 23 and positioned to be in line with the two end targets 20 and 23 so that as viewed through the transit the target markings 15 are bisected by the transit vertical cross hair 29 as shown in Figure 4. Then the transit is moved in elevation to view the intermediate targets 21 and 22. If the vertical center line of the missile is out of angular alignment the intermediate target markings will appear as a curved line when viewed through the transit as illustrated in Figure 5. If the missile is laterally out of alignment the intermediate target markings will appear laterally displaced from transit cross hairs as shown in Figure 6. If the missile center line is true, the target markings will appear as illustrated in Figure 4, straddling the transit cross hair 29.

The same procedure as described above is employed with a second transit 30 for checking the linearity of the horizontal center line of the missile body.

The rounded target in being viewable over a wide range of angles in one plane to indicate alignment deviations in another plane lends itself well to existing optical tooling techniques for checking large structures such as aircraft fuselages and manufacturing tooling fixtures, the alignment of which must be held to close tolerances. The indicia on the rounded surface of the target quickly and unmistakably indicates the alignment condition.

Since the target may be viewed at oblique angles the transit may be located close to the structure being checked without the use of complicated reflecting mirror arrangements. Furthermore, both the horizontal and vertical aligment may be checked simultaneously by simply having the transit for checking vertical alignment mounted on a raised platform. The transit need only be high enough to allow a line of sight to be drawn to each of the vertical alignment targets.

While a specific configuration for the optical target has been shown and described herein and while the structure to be aligned is shown and described as a missile it is for purposes of illustration rather than limitation. It should be understood that many alterations, modifications and substitutions may be made to the instant disclosure without departing from the spirit and scope of the invention as defined by the appended claims.

I claim:

1. An optical target comprising, a base, a hemispherical dome member secured to said base, and segmented markings formed at the outer surface of said dome member and spaced apart in a generally parallel relationship defining a great circle path therearound.

2. An optical target for checking centerlines of large objects comprising, a base, said base having a post defining a centerline, a rounded dome member secured to said base and centered with respect to said post, and spaced apart in a generally parallel relationship segmented markings formed at the outer surface of said dome member and defining a great circle path therearound intersecting the centerline defined by said post.

3. An optical target for checking the alignment of structure such as the body of a missile comprising, a generally hemispherically shaped dome member, a base supporting said dome member, and markings formed at the outer surface of said dome member and spaced apart in a generally parallel relationship defining at least one great circle path therearound.

4. An optical target for checking the alignment of structure such as the body of a missile comprising, a generally hemispherically-shaped dome member, a base supporting said dome member, and indicia formed at the outer surface of said dome member and defining at least one great circle path therearound, the indicia consisting of a plurality of rows of segmented marks.

References Cited in the file of this patent

UNITED STATES PATENTS

| | | |
|---|---|---|
| 2,043,625 | Kindner | June 9, 1936 |
| 2,294,990 | Kollsman | Sept. 8, 1942 |

FOREIGN PATENTS

| | | |
|---|---|---|
| 124,573 | Great Britain | Mar. 27, 1918 |